United States Patent [19]

Maney

[11] Patent Number: 4,890,047
[45] Date of Patent: Dec. 26, 1989

[54] DIGITAL PULSE WIDTH MODULATION CONTROL OF BRUSHLESS DC MOTORS

[75] Inventor: John J. Maney, Palm Bay, Fla.

[73] Assignee: Harris Corporation, Melbourne, Fla.

[21] Appl. No.: 878,257

[22] Filed: Jun. 25, 1986

[51] Int. Cl.⁴ .............................................. G05B 1/06
[52] U.S. Cl. ................................... 318/661; 318/599; 318/605
[58] Field of Search ............... 318/661, 605, 254, 432, 318/599, 616, 636–637, 654, 657, 138, 439, 254, 720–723, 727, 799, 798, 805, 807, 810–811

[56] References Cited

U.S. PATENT DOCUMENTS

| 3,706,923 | 12/1972 | Dunfield | 318/661 |
| 4,282,468 | 8/1981 | Barker et al. | 318/661 |
| 4,323,884 | 4/1982 | Durandeau et al. | 318/657 |
| 4,328,483 | 5/1982 | Swartz et al. | 318/654 |
| 4,352,050 | 9/1982 | Sakano | 318/661 |
| 4,384,242 | 5/1982 | Ono | 318/661 |
| 4,520,300 | 5/1985 | Frodella | 318/661 |
| 4,529,922 | 7/1985 | Ono | 318/661 |

OTHER PUBLICATIONS

"Velocity and Position Feedback in Brushless DC Servo Systems", PCIM, Aug. 1985, by J. Tomasek, pp. 55–60.

"A New Microprocessor Based Brushless Servo Amplifier for Optimum Current Vector Control." Proc. 13th Annual Symp. Incremental Motion Control Systems and Devices, by S. Meshkat, U. Illinois at Urbana-Champaign, 1983.

"Resolver Commutation of Brushless DC Motors" by J. Cross, R. Lazarski and J. Solt, Motion, Mar./Apr. 1987, pp. 3, 4, and 7–10.

"Brushless DC Motors, A Tutorial Study", by E. Aha, Motion, Mar./Apr. 1987, pp. 20, 23, 24 and 26.

Primary Examiner—William M. Shoop, Jr.
Assistant Examiner—David Martin
Attorney, Agent, or Firm—Antonelli, Terry & Wands

[57] ABSTRACT

An improved torque control for a brushless DC motor is disclosed. A torque command A of a time varying nature is applied to an excitation winding which is magnetically coupled through a resolver to produce output signals respectively on sensing windings of Acosine $\theta$ and of Asine $\theta$ wherein $\theta$ is the angular position of an armature and resolver of the motor. Armature windings respectively coupled to the sensing windings are driven by signals proportional to or equal to the signals sensed by the sensing windings to produce a torque equal to A.

14 Claims, 5 Drawing Sheets

DIGITAL PULSE WIDTH MODULATION CONTROL OF BRUSHLESS DC MOTORS

BACKGROUND OF THE INVENTION

The present invention relates to torque control of brushless DC motors.

1. Description of the Prior Art

Brushless DC motors achieve brushless commutation by the use of a resolver which is rotationally coupled to an armature shaft and a pair of resolver windings, respectively producing output signals sine $\theta$ and cosine $\theta$ wherein $\theta$ is the angular position of the shaft, which are used to control the windings for driving the armature. The torque produced by the armature is a function of a scaling factor applied to the sine $\theta$ and cosine $\theta$ signals which are sensed by the sensing windings.

FIG. 1 illustrates a prior art system which is sold by MPC Products Corporation of Skokie, Ill., as Part Nos. W 35 A and W 36 A. The armature 12 is coupled to a resolver 14 by the rotor shaft 16. The resolver functions in combination with a resolver excitation oscillator 18 and a pair of resolver demodulators 20 and 22 to produce output signals from the respective resolver demodulators proportional to sine $\theta$ and cosine $\theta$ wherein $\theta$ is the rotational position of the armature 12 and resolver 14. The torque T produced by the armature 12 is controlled by a torque command 24 which is multiplied in multipliers 26 and 28 to respectively produce control signals Tsine $\theta$ and Tcosine $\theta$. The respective signals Tsine $\theta$ and Tcosine $\theta$ are applied to pulse width modulation amplifiers 30 and 32. In this system, the motor torque is controlled by varying the amplitude of the scaling factor for the sine and cosine voltages sensed by windings 20 and 22. The pulse width modulation amplifiers 30 and 32 have a threshold below which applied control signals Tsine $\theta$, Tcosine $\theta$ do not cause the production of a driving signal to be applied to the windings 34 and 36.

A brushless DC motor controller similar to that described above with regard to FIG. 1 has been produced which utilizes digital processing. In this system, the sensed sine and cosine signals from the resolver windings are converted to digital, multiplied by a digital torque command and used to control a digital pulse width modulation circuit. With this system, the torque is controlled by the variation of the duty cycle of the digital pulse width modulation circuit.

U.S. Pat. No. 4,520,300 discloses a brushless DC motor which multiplies the sensed signals from the resolver winding sine $\theta$, cosine $\theta$ with a torque value T to produce torque control. Driving pulses applied to the armature windings are reset when the instantaneous amplitude of a current feedback pulse overtakes the amplitude of the torque control signals Tcosine $\theta$ or Tsine $\theta$.

SUMMARY OF THE INVENTION

The present invention is an improved torque controller for brushless DC motors which provides precise torque commands of even small magnitude. With the invention, the torque command is applied to the resolver excitation signal source and picked up with the resolver sensing windings to produce output signals equal to Tsine $\theta$ and Tcosine $\theta$ which are processed to control the armature to produce the commanded torque T.

The present invention has advantages over the prior art. First, the application of the torque command as an excitation signal for the resolver eliminates the requirement for multipliers found in the prior art wherein the sensed angular signals sine $\theta$, cosine $\theta$ are multiplied by the commanded torque T. Additionally, by applying the excitation signal of the resolver as the torque command itself, the need for a separate excitation source to excite the resolver is eliminated. Finally, precise control for low value torque commands may be readily achieved.

A torque controller for a brushless DC motor having an armature which is rotatably driven by at least one pair of armature windings and a resolver rotated with the armature which functions in the sensing of the rotational position of the armature by the application of a time varying electrical signal A to a resolver excitation winding which is picked up by first and second sensing windings which respectively produce signals equal to Asine $\theta$ and Acosine $\theta$ wherein $\theta$ is the angular shaft position of the armature and resolver in accordance with the present invention includes a source of a time varying torque command A which is applied to the resolver excitation winding for controlling the torque produced by the armature; a detector for detecting the time varying signal Asine $\theta$ picked up by the first sensing winding; a detector for detecting the time varying signal Acosine $\theta$ picked up by the second sensing winding; and a controller for controlling the at least one pair of armature windings as a function of the torque command A. Preferably, the detectors for the signals Asine $\theta$, Acosine $\theta$ are synchronous detectors which permit the detecting of both the magnitude and direction of the torque command signal. The controller for controlling the at least one pair of armature windings includes a pair of summation circuits which respectively have positive and inverting inputs and an output with the positive input of the respective summation circuits being Asine $\theta$ and Acosine $\theta$, and the negative input being the feedback signals representing sensed current in the armature windings. A pair of drivers are respectively coupled to the outputs of the summation circuits for driving different armature windings with a torque equal to that detected by the associated synchronous demodulator.

Each of the drivers includes an integrator coupled to the output of its associated summation circuit for producing an output signal which is an integral of the output signal from the associated summation circuit; a detector coupled to the output of the associated integrator for detecting when the output crosses 0; and a circuit coupled to the output of the circuit for detecting when the amplitude of the integrator crosses 0 for activating an associated armature winding with a driving signal which is applied to the armature winding from a reference time after the associated integrator has a stored voltage Asine $\theta$ or Acosine $\theta$ until the output of the integrator is detected as crossing 0, the circuit for activating including a feedback signal proportional to the driven armature current, that is applied to the inverting input of the associated summation circuit.

A first embodiment of the invention includes a source of pulses of a time duration, and a power switching circuit. The pulse source has first and second outputs activated when the torque direction signal (SGN) is high or low, respectively. The pulses begin at the end of each pulse of the driving pulse train, and end when the output of the associated integrator crosses zero and SGN changes. The power switching circuit is comprised of first and second half-bridges, connected to the first and second ends of the armature, and having separate logic control inputs connected to the first and second outputs of the source of pulses of a time duration. Each half-bridge of the power switching circuit is connected to ground through a current-sense resistor and connected directly to the positive power supply potential. When a pulse is present, the half-bridge having the control input high sources current from the power supply to one end of the armature, and the half-bridge having the control input low sinks current from the other end of the armature to ground. When no pulse is present, both control inputs are low and no current is sourced to either end of the armature. The feedback included in the armature activating circuit is a differential amplifier with the noninverting input connected to the ground terminal of the first half-bridge and its associated sense resistor, and the inverting input connected to the ground terminal of the second half-bridge and its associated sense resistor.

A second embodiment of the invention further includes a source of a driving pulse train of a given frequency; and the circuit for activating an armature winding includes a pulse source for producing pulses of a time duration equal to the time duration between the end of each pulse produced by the source of a driving pulse train and the time when the output of the associated integrator crosses zero; a storage for storing a control signal which indicates a direction of the torque of the torque command; an armature winding having first and second ends; power switching circuit comprised of first and second half-bridges, connected to the first and second ends of the armature, and having common enable and phase logic control inputs, each half-bridge of the power switching circuit being connected to ground through a current-sense resistor and connected directly to the positive power supply potential. When the enable input is active (low) and the phase input is high, the first half-bridge sources current from the power supply to the first end of the armature, and the second half-bridge sinks current from the second end of the armature to ground. When the enable input is active (low) and the phase input is low, the second half-bridge sources current from the power supply to the second end of the armature, and the first half-bridge sinks current from the first end of the armature to ground. When the enable input is inactive (high), the two half-bridges neither source nor sink current. The enable input of the two half-bridges is connected to the source for producing pulses of a time duration, and the phase input is connected to the storage of the direction of the torque command. The feedback included in the armature activating circuit is a differential amplifier with the noninverting input connected to the ground terminal of the first half-bridge and its associated sense resistor, and the inverting input connected to the ground terminal of the second half-bridge and its associated sense resistor.

The time varying torque command may be produced by a circuit for producing a pulse train of a specified duty cycle and frequency.

The invention further includes a register for storing a control bit indicating the direction of the torque A; a circuit for inverting the polarity of every other pulse produced by the circuit for producing a pulse train of a specified duty cycle and frequency which is applied to the resolver excitation winding; and a circuit for enabling the application of the pulses produced by the circuit for producing a pulse train of a specified duty cycle and frequency to the resolver excitation winding.

Preferably, the inverter of every other pulse is an amplifier having a control input which changes the polarity of the output signal with respect to the input signal to be amplified when the control input is of a first level and which does not change the output signal polarity when the control signal is of a second level and an EXCLUSIVE OR gate having two inputs and an output which produces the control signal, one of the inputs being coupled to the output of a register storing the signal indicating the direction of applied torque and the other input being coupled to a source of a square wave having a frequency one-half the frequency of the pulse train of the specified duty cycle and frequency.

DESCRIPTION OF THE PREFERRED EMBODIMENTS

Figure 1:
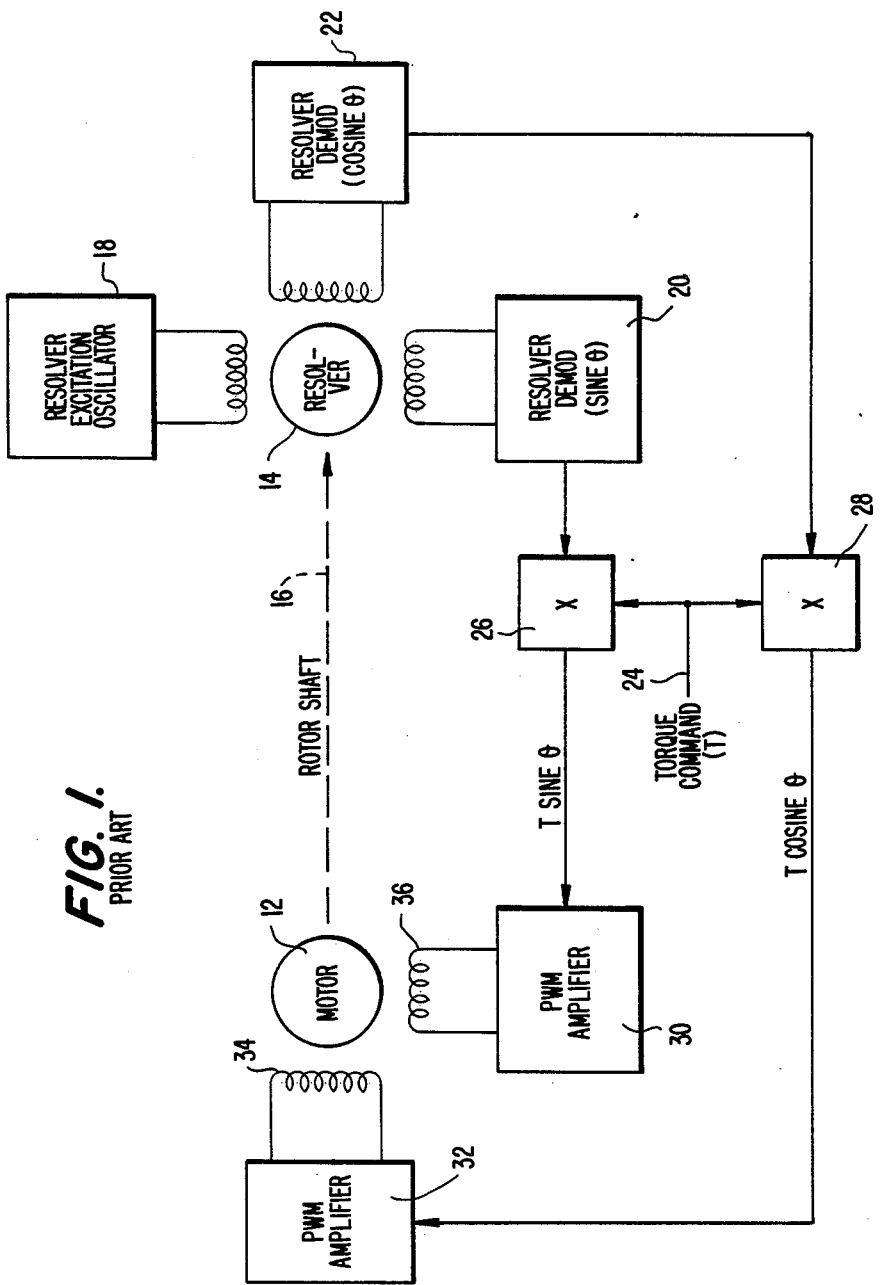
FIG. 1 is a diagram of a prior art torque controller for a brushless DC motor.
Figure 2:
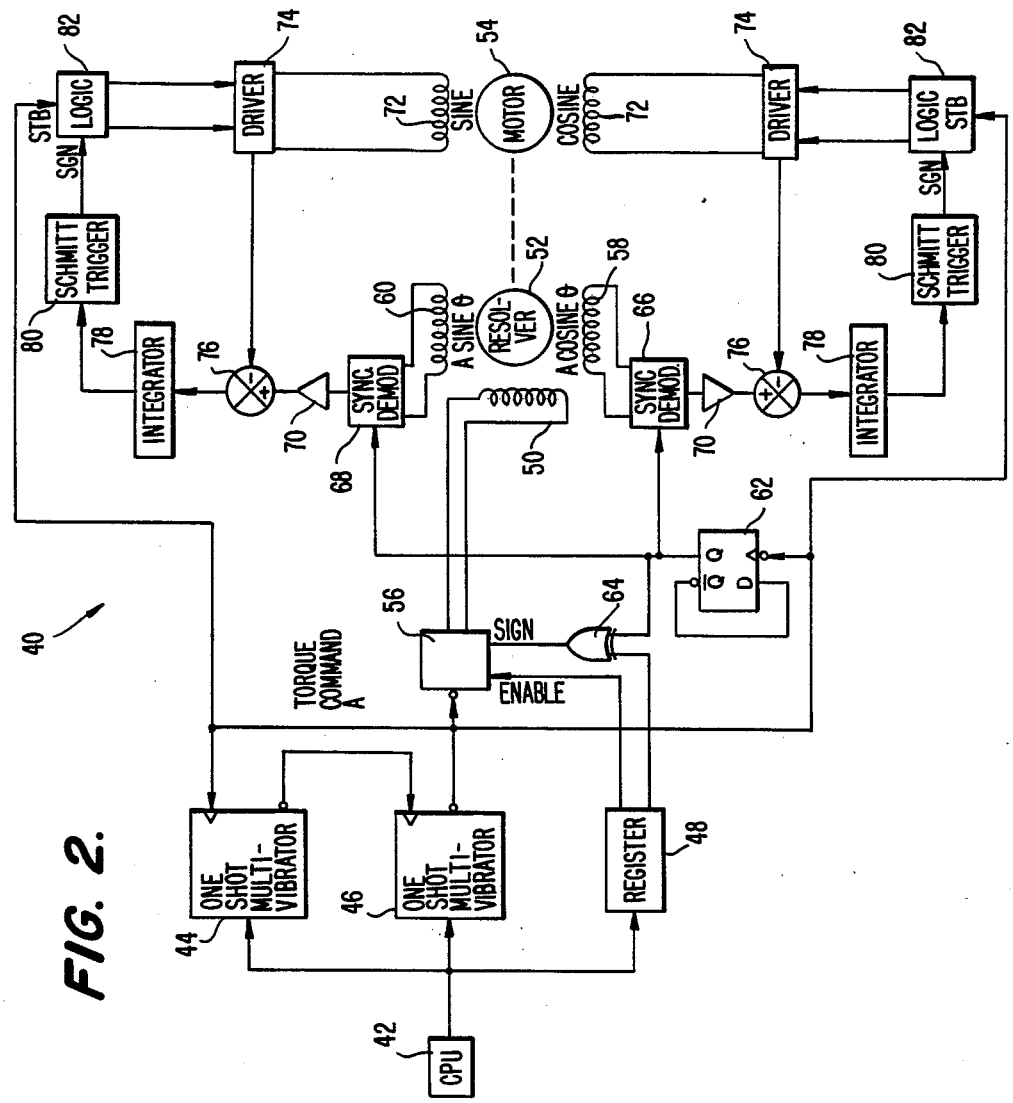
FIG. 2 is a diagram of the preferred embodiment of a torque controller in accordance with the present invention.

FIG. 2 illustrates a torque controller 40 in accordance with the present invention. The present invention differs from the prior art in providing the application of a torque command signal A directly to the resolver excitation winding of a resolver. The resultant pulses A are applied by the resolver excitation winding and act through magnetic coupling of the resolver and a pair of sensing windings which respectively produce output signals Asine $\theta$ and Acosine $\theta$ where $\theta$ is the angle of the shaft of the armature of a brushless DC motor. The amplitude and polarity of the sensed output signals is used to control the driving of armature windings of the motor until the area under the pulses driving the respective armature windings is equal to the area under the pulses defined by Asine $\theta$, Acosine $\theta$.

Figure 4:
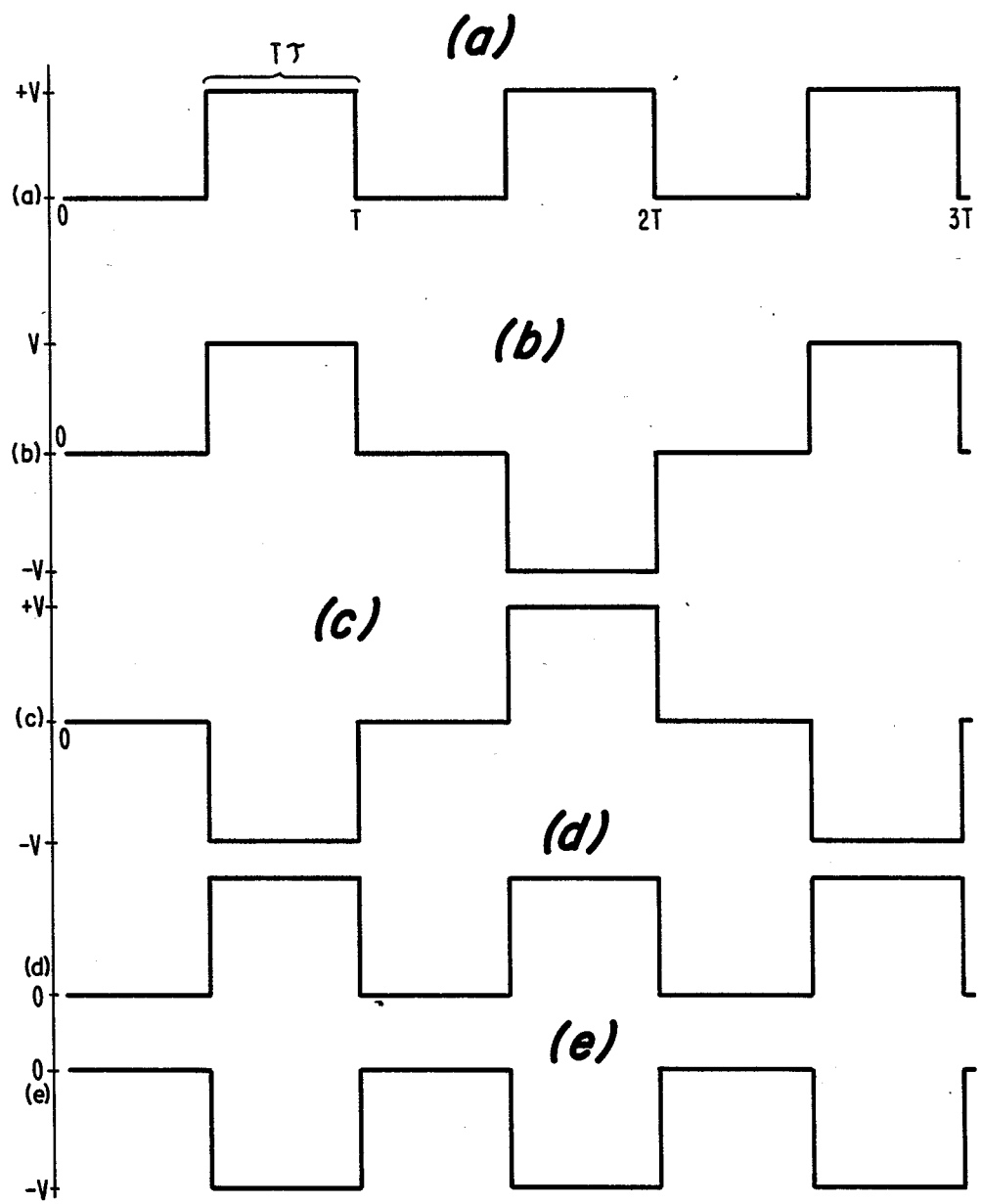
FIGS. 4(a)–4(e) are oscillograms of various waveforms which occur in different parts of the embodiment illustrated in FIG. 2.

Preferably, the control of torque in accordance with the present invention is by a central processing unit 42 which generates three different control signals for controlling the operation of the system. The CPU may be any suitably programmed microprocessor such as a Z80. The first signal produced by the CPU 42 is a torque command signal which defines the magnitude of the desired torque as a function of the pulse width modulation of a cycling rectangular waveform having a programmable period. The CPU 42 generates the torque command which consists of a signal defining both the period of the recurring rectangular waveform T and the duty cycle $\tau$ as illustrated in FIG. 4(a). The duty cycle $\tau$ and period may be read from a lookup table stored in a EPROM which is addressed by a digital number generated by the CPU 42 or inputted thereto. The second signal generated by the CPU 42 is the direction bit which indicates whether the torque A is to be clockwise or counterclockwise. The third signal generated by the CPU is the ENABLE signal which is used to control the turning on and off of the motor.

The torque command signal, as illustrated in FIG. 4(a), is produced by a pair of cross-coupled digital one-shots 44 and 46. The multivibrators may be implemented by two-thirds of the circuit functions available on an 8254 integrated circuit chip. The output pulses produced by the digital one-shot 46 are unipolar, as illustrated in FIG. 4(a), and therefore do not convey any direction information regarding the desired torque A. The pulses produced by digital one-shot 46 are used to drive the excitation winding of the resolver, to drive a signal source of a square wave of one-half the frequency of the output of the digital one-shot 46 and to drive the logic circuits and drivers as described, infra. Register 48 functions to store the torque direction signal and the ENABLE signal as outputted by the CPU 42.

The excitation of the excitation winding 50 associated with the resolver 52 of motor 54 is described as follows. The pulse waveform of FIG. 4(a) is applied to amplifier 56 to produce an excitation signal of sufficient magnitude to excite the excitation winding 50. As is known in the art, the excitation winding 50 interacts with the resolver 52 to produce output signals on the respective sensing windings 58 and 60 which respectively are proportional to cosine $\theta$ and sine $\theta$. As a consequence of the torque command signal A being used to drive the excitation winding 50, the output signals sensed by the sensing windings 58 and 60 are respectively equal to Acosine $\theta$ and Asine $\theta$ wherein $\theta$ is the angular position of the resolver and motor armature. When applied to the amplifier 56, the ENABLE signal permits the suitably amplified torque command signal of a pulsating form, as illustrated in FIG. 4(a), to be coupled to the output to excite excitation winding 50.

In order to permit a steady state (DC) torque command to be coupled from the excitation winding 50 to the sensing windings 58 and 60, it is necessary to chop the unipolar signal, as illustrated in FIG. 4(a), into a bipolar signal, as illustrated in FIGS. 4(b) and 4(c), as described, infra. The inverting of every other pulse of the torque command signal A, as illustrated in FIG. 4(a), is produced by the combination of flip-flop 62 which is driven by the output signal from the one-shot multivibrator 46 to generate a square wave having a frequency one-half that illustrated in FIG. 4(a). The output of the flip-flop 62 is coupled to an exclusive OR gate 64 which has another input from the register 4 which stores the desired direction for the torque to be applied, i.e. clockwise or counterclockwise.

A truth table for the EXCLUSIVE OR gate 64, which generates the SIGN input signal to the amplifier 56 for causing the inversion of every other output pulse of the waveform, as illustrated in FIG. 4(a), by inverting the gain of the amplifier is as follows. It is assumed that clockwise rotation is encoded as a 1 bit in the register 48 and counter-clockwise rotation is encoded as a 0 bit. Furthermore, it is assumed that the low level of the pulse waveform in FIG. 4(a) is encoded as a 0 bit and the high level waveform (duty cycle equal to $\tau$) of FIG. 4(a) is encoded as a 1 bit. Because the output of the flip-flop 62 is at one-half the frequency of the waveform of FIG. 4(a), the output signal from the flip-flop 62 will have a 0 level equal to the time period T and a one level equal to the time period T for a single cycle of duration 2T. A 0 level for the SIGN signal causes the amplified pulses produced by amplifier 56 to have the same polarity as outputted by the one-shot multivibrator 56 and a 1 level SIGN signal causes the inversion by the amplifier of the output pulses outputted by one-shot multivibrator 56. With a 1 being used to encode the direction of clockwise torque, the amplifier 56 produces the output waveform in FIG. 4(b). With a 0 level being used to encode counterclockwise torque, the amplifier 56 produces the output waveform of FIG. 4(c).

A pair of synchronous demodulators 66 and 68 convert the bipolar output signals produced respectively by sensing windings 58 and 60 into unipolar signals which have a polarity which is a function of the torque direction bit stored in register 48 as described, supra. If the stored torque direction bit is for clockwise rotation, the synchronous demodulators 66 and 68 will produce a pulsating waveform as illustrated in FIG. 4(d). If the stored torque direction bit is for counterclockwise rotation, the synchronous demodulators 66 and 68 will produce the pulse waveform of FIG. 4(e). The polarity of the output waveform from the synchronous demodulator 66 and 68 determines the direction of rotation of the motor 54.

A pair of amplifiers 70, which are of identical design, are respectively coupled to the outputs of the synchronous demodulators 66 and 68. The amplifiers 70 are provided to provide an output signal of a desired level to cause the driving current applied to the sine and cosine armature windings 72 to be a linear function of the torque command A (the area under each output pulse produced by the one-shot multivibrator 46).

The feedback signals produced by each of the drivers 74 is subtracted from the output from an associated amplifier 70 in a pair of identical summation circuits 76. The output of each of the summation circuits 76 is applied to the associated integrator 78 which integrates the difference of the pair of the inputs to the summation circuit.

A pair of Schmitt triggers 80 are respectively coupled to the outputs of the integrators 78 which detect when the level of the integrated output signal from the integrators 78 crosses 0. The significance of detecting when the level of the output signal from the integrators 78 crosses 0 is that it signifies the condition when the transistor drivers 74 have driven the sine and cosine windings 72 with a current pulse having an integral directly proportional to or equal to the area under each torque command A pulse of FIG. 4(a). When this condition is satisfied, the resultant torque which is equal to the root of the sum squared of the orthogonal armature currents is equal to A(sine $\theta^2$+cosine $\nu^2$) which is equal to A.

A pair of identical logic circuits 82 and drivers with feedback 74 drive the associated sine and cosine windings 72. Two separate embodiments of the logic circuits 82 and drivers 74 are discussed, infra, in conjunction with FIGS. 3(a) and 3(b). As illustrated, the frequency of the output pulses from the logic circuits 82 is equal to the frequency of the output pulses from the one-shot multivibrator 46, but it should be understood that the invention is not limited thereto. The polarity of the output pulse trains is controlled by the value of the bit stored in the register 48 which controls the direction of the applied torque. Negative going pulses cause the application of torque by the armature winding in on direction while positive going pulses cause the application of torque by the armature winding in the other direction.

The invention eliminates deadband consequent from torque commands of low magnitude because the finite switching speed and hysteresis of the components in the current control loop consisting of the drivers 74, summing circuit 76, integrators 78, Schmitt trigger 80 and logic circuit 82, causes the production of small motor current pulses of alternating polarity to be outputted by the logic circuits 82. No net torque is applied if the torque command is disabled, because the current control loop 74 forces the average of these pulses to 0. If the torque command pulses are small, they bias the integrator such that the average is equal to the torque command despite the production of the alternating polarity pulses by the logic circuits 82.

Figure 3A:
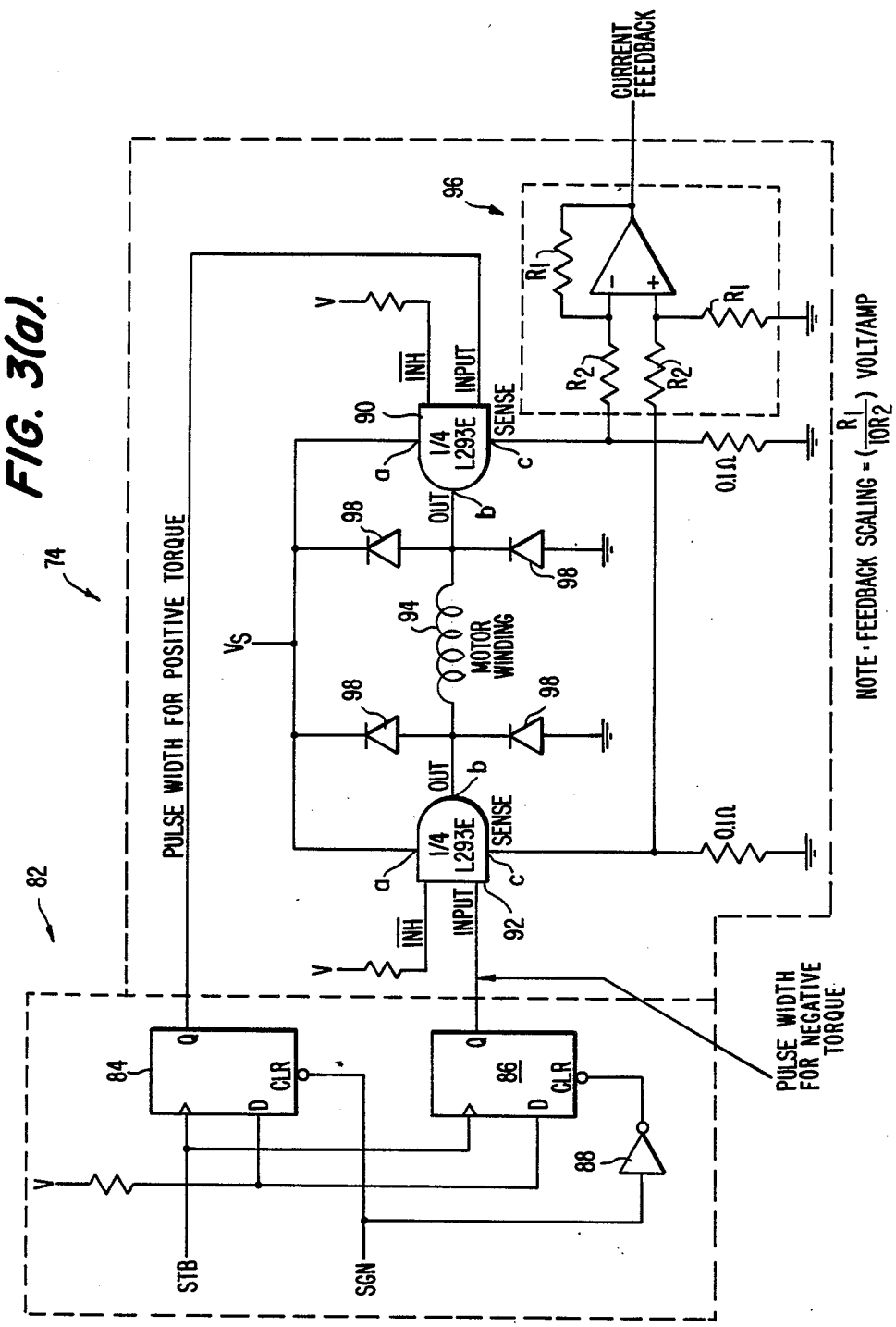
FIG. 3(a) is a schematic of a first embodiment of logic and driver circuits of FIG. 2.

FIG. 3(a) illustrates the details of a first embodiment of transistor bridge 74 and logic circuit 82 of FIG. 2. The same inputs in FIGS. 2 and 3(a) are labeled identically. A pair of flip-flops 84 and 86 respectively produce pulse trains corresponding to positive and negative torque commands. The flip-flops 84 and 86 each contain a clear terminal for resetting the flip-flop to a 0 (low) output state when a low level signal is applied. The clock input of each of the flip-flops 84 and 86 is triggered by the trailing edge of the signal STB of the torque command pulse A produced by the one-shot multivibrator 46. Inverter 88 ensures that only one of the flip-flops 84 and 86 will at any time produce an output pulse of a high 1 level with the other flip-flop being held low by the presence of a low level CLR input signal which causes that flip-flop to be held in the clear state. The duration of the pulses from the logic circuit 82 is from the trailing edge of the STB signal to the time when the output of the associated integrator crosses zero and the output of the Schmitt trigger 80 changes state.

The pulse signal for positive torque commands outputted by flip-flop 84 is applied to switching circuit 90 and the pulse width signal for negative torque commands outputted by flip-flop 86 is applied to switching circuit 92. The switching circuits 90 and 92 may be implemented by one-fourth of a L293E chip. The function of the switching circuits 90 and 92 is to establish a current path between the power supply potential $V_s$ and ground that flows through the motor armature winding 94 which has a direction which is determined by the polarity of the signals applied to the switching circuits 90 and 92. Each switching circuit has three terminals "a", "b" and "c" and control circuitry which controls the sourcing or sinking of current through the terminals under input control conditions which are labeled "INPUT" and "INH". The respective circuits 90 and 92 are illustrated as AND gates, but the actual function of the INH input when high is to enable the device to source or sink current through terminal "b", and when low is to force terminal "b" to a high impedance state. When the INH input is high and the input labeled "INPUT" of each switch 90, 92 is high, the device sources current from terminal "a" to terminal "b" and when INPUT is low, the device sinks current from terminal "b" to terminal "c". For each STB pulse, the inverter 88 causes one of the switches 90, 92 to be low while the other switch is high which insures that one of the switches sources current to one end of the armature while the other sinks current from the other end of the armature. Assuming that a positive polarity input signal is applied to switching circuit 90 and a negative polarity input is applied to switching circuit 92, current flow is from the power supply $V_s$ into terminal "a" through the switching circuit 90 out terminal "b" through motor winding 94 into the terminal labeled "b" of switching circuit 92 through switching circuit 92 out the terminal labeled "c" to ground which establishes a particular direction of motor torque. When the output states of the flip-flops 84 and 86 reverse, the opposite operation occurs as described, supra, in that the current flow is from the power supply $V_s$ into terminal "a" of switching circuit 92 through switching circuit 92 out terminal "b" through motor winding 94 into terminal "b" of the switching circuit 90 through switching circuit 90 and out terminal "c" to ground. Operational amplifier 96 functions as a differential amplifier which produces the feedback input signal to the summation circuit 76 as described, supra. The design of the operational amplifier 96 is conventional in that the gain is determined in accordance with well-known relationships. Diodes 98 are provided to permit the dissipation of energy stored in the inductive motor winding 94 during the interval when no output pulse is present from the flip-flops 84 and 86.

Figure 3B:
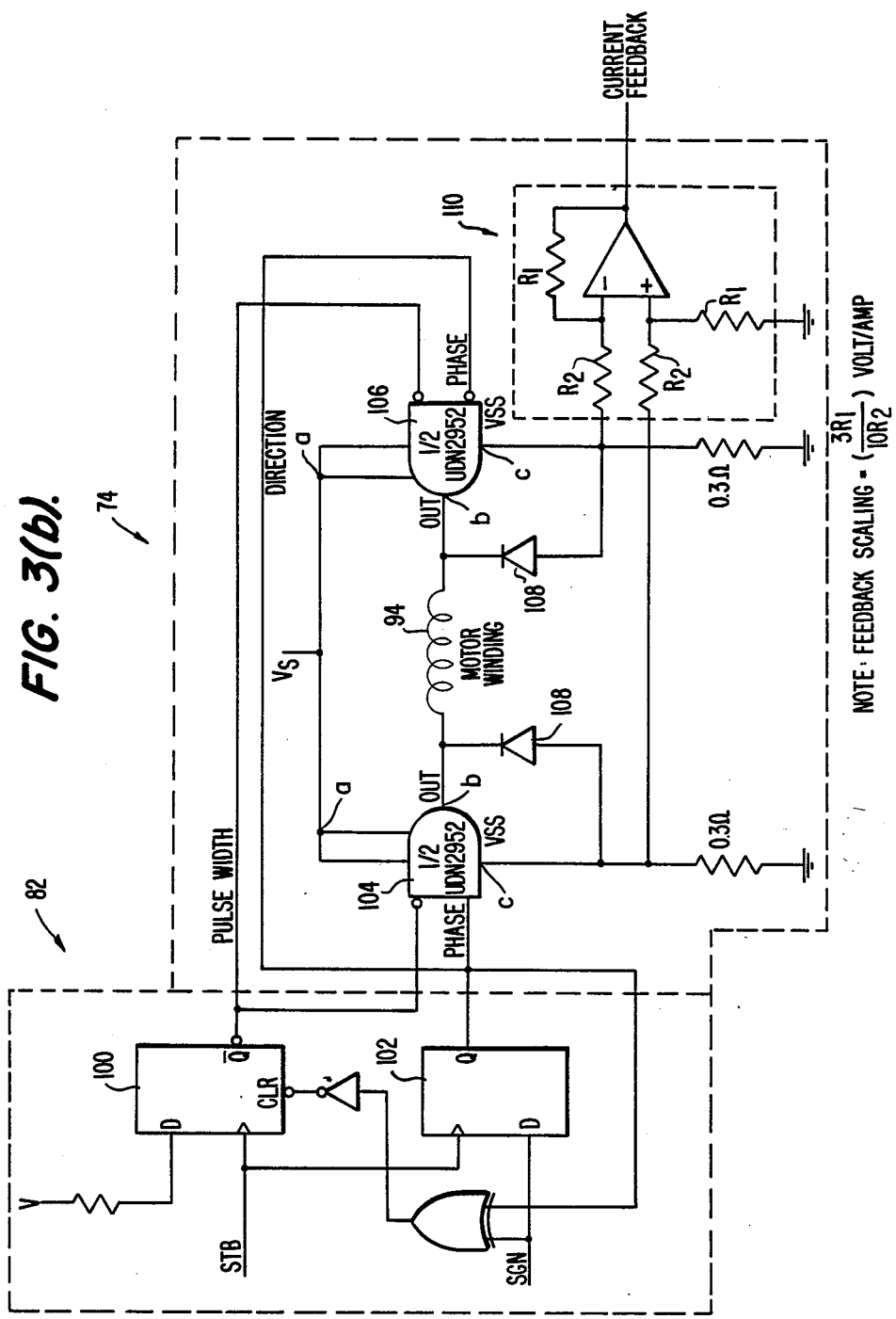
FIG. 3(b) is a schematic of a second embodiment of logic and driver circuits of FIG. 2.

FIG. 3(b) illustrates the details of a second embodiment of the transistor bridge 74 and logic circuit 82 of FIG. 2. The same inputs of FIGS. 2 and 3(b) are labeled identically. A pair of flip-flops 100 and 102 latch respectively the pulse width of the signal output, which occurs from the falling edge of the torque command signal A to the point at which the output from the associated Schmitt trigger 80 has changed state and the sign bit which is produced by the Schmitt trigger 80. Switching circuits 104 and 106 perform a function analogous to switching circuits 90 and 92 described above with reference to FIG. 3(a) in that they control the direction of current flow through motor winding 94 from the power supply Vs through ground to determine the direction of motor torque which is applied to the armature. Each switch 104 and 106 has three terminals "a", "b" and "c" like switches 90 and 92 of FIG. 3(a). The control function is illustrated as an AND gate, but the actual function of the PULSE WIDTH input when low is to enable the device to source or sink current through terminal "b", and when high is to force terminal "b" to a high impedance state. The phase input selects between sourcing and sinking current to perform the steering function, controlled by the sign bit outputted by the flip-flop 102. Diodes 108 perform the analogous function to that performed by diodes 94 in FIG. 3(a). Operational amplifier 110 performs a function analogous to the operational amplifier 96 in FIG. 3(a) but has a different scaling factor.

While the invention has been described in detail with regard to its preferred embodiment, it should be understood stood that numerous modifications may be made thereto without departing from the spirit and scope of the invention as defined in the appended claims. For example, the invention can be adapted to analog torque control by the inputting of a pulse width modulation or pulse amplitude modulation signal from an analog velocity control loop The invention can also be adapted to three-phase or multi-phase motors by using a three-phase or multi-phase resolver, and adding more demodulation, current loop and drive circuits.

What I claim as my invention is:

1. A torque controller for a brushless DC motor having an armature which is rotatably driven by at least one pair of armature windings and a resolver driven by the armature which functions in the sensing of the rotational position of the armature by the application of a time varying electrical signal A to a resolver excitation winding which is picked up by first and second sensing windings which respectively produce signals equal to Asine $\theta$ and Acosine $\theta$ wherein $\theta$ is the angular position of the armature and resolver comprising:

(a) means for applying a variable torque command A to said resolver excitation winding for controlling the torque produced by said armature;

(b) means for detecting the time varying signal Asine $\theta$ picked up by said first sensing winding;

(c) means for detecting the time varying signal Acosine $\theta$ picked up by said second sensing winding; and (d) means for controlling the at least one pair of armature windings as a function of the torque command A.

2. A torque controller in accordance with claim 1 wherein said torque command A is applied by an external source.

3. A torque controller in accordance with claim 2 wherein:

(a) the means for detecting the time varying signal Asine $\theta$ comprises a first synchronous demodulator coupled to the first sensing winding;

(b) the means for detecting the time varying signal Acosine $\theta$ comprises a second synchronous demodulator coupled to the second sensing winding;

(c) said means for controlling comprising:

(i) a first means having two inputs and an output which outputs a difference of the inputs, the first input being coupled to the first synchronous demodulator;

(ii) a second summation means having two inputs and an output which outputs a difference of the inputs, the first input being coupled to the second synchronous demodulator;

(iii) first driving means coupled to the output and the second input of the first means for driving one of each of the at least one pair of armature windings until torque applied to the armature winding is proportional to the quantity Asine $\theta$ detected by the first synchronous demodulator; and (iv) second driving means coupled to the output and the second input of the second means for driving the other of each of the at least one pair of armature windings until the torque applied to the armature winding equals the quantity Acosine $\theta$ detected by the second synchronous demodulator.

4. A torque controller in accordance with claim 3 wherein (a) said first driving means comprises:

(i) a first integrator coupled to the output of the first means for producing an output signal which is an integral of the output signal of the first means;

(ii) means coupled to the output of the first integrator for detecting when the output of the first integrator crosses zero;

(iii) first means coupled to an output of the means coupled to the output of the first integrator for activating said one of the one or more pairs of armature windings with a driving signal which is applied thereto from a reference time after the first integrator has a stored voltage Asine $\theta$ until the output of the first integrator is detected as crossing zero, said first means for activating including means for applying a feedback which is a function of the driving signal to the inverting input of the first means; and (b) said second driving means comprises:

(i) a second integrator coupled to the output of the second means for producing an output signal which is an integral of the output signal of the second means;

(ii) means coupled to an output of the second integrator for detecting when the output of the second integrator crosses zero; and (iii) second means coupled to the output of the means coupled to an output of the second integrator for activating said other of said one or more pairs of armature windings with a driving signal which is applied thereto from a time after the second integrator has a stored voltage Acosine $\theta$ until the output of the second integrator is detected as crossing zero, said second means for activating including means for applying a feedback which is a function of the driving signal to the inverting input of the second means.

5. A torque controller i accordance with claim 4 further comprising:

(a) means for generating a driving pulse train of a given frequency;

(b) said first means for activating comprises:

(i) a first amplifier for providing said feedback;

(ii) a first pulse producing means for producing a train of driving pulses applied to the armature in either a positive or negative sense, the polarity of the pulses being controlled by whether the output of the first integrator is positive or negative, the frequency of the pulses produced by the first pulse producing means being controlled by the pulse train generated by the means for generating a driving pulse train of a given frequency and the amplifier being coupled to the first pulse producing means; and (c) said second means for activating comprises:

(i) a second amplifier for providing said feedback;

(ii) a second pulse producing means for producing a train of driving pulses applied to the armature in either a positive or negative sense, the polarity of the pulses being controllable by whether the output of the second integrator is positive or negative, the frequency of the pulses produced by the second pulse producing means being controlled by the pulse train generated by the mean for generating a driving pulse train of a given frequency and the amplifier being coupled to the second pulse producing means.

6. A torque controller in accordance with claim 5 wherein the means for applying a time varying torque command comprises means for producing a pulse train of a specific duty cycle and frequency, the pulse train of specified duty cycle and frequency functioning as the driving pulse train of a given frequency.

7. A torque controller in accordance with claim 6 further comprising:

(a) means for specifying the direction of the torque to be applied by the applied torque command A;

(b) means for inverting the polarity of every other pulse produced by the means for producing a pulse train of a specified duty cycle and frequency which is applied to said resolver excitation winding; and (c) means for enabling the application of the pulses produced by the means for producing a pulse train of a specified duty cycle and frequency to the resolver excitation winding.

8. A torque controller in accordance with claim 7 wherein (a) said means for specifying the direction of the torque to be applied by the applied torque command comprises a register for storing a binary value with a first level specifying one direction of torque and a second level specifying a second direction of torque and producing an output signal of said stored binary value; and wherein (b) said means for inverting every other pulse is an amplifier having an input which changes the polarity of the output signal with respect to the input signal when the input signal of a first level is applied and which does not change the output signal polarity when the input signal of the second level is applied; and an EXCLUSIVE OR gate having two inputs and an output which produces the input signal, one of said inputs being coupled to the output of said register for storing and the other input being coupled to a source of a square wave having a frequency one-half of the frequency of the pulse train of a specified duty cycle and frequency.

9. A torque controller in accordance with claim 8 wherein the means for enabling causes said amplifier of the means for inverting to cease output pulses when an enabling signal of a particular level is not present.

10. A torque controller in accordance with claim 8 wherein the source of a square wave having a frequency one-half the frequency of the pulse train of a specified duty cycle and frequency is a means which divides the frequency of the pulse train of specified duty cycle and frequency in half.

11. A torque controller in accordance with claim 4 further comprising:

(a) means for generating a driving pulse train of a given frequency; and (b) each means for activating comprises:

(i) means for producing pulses of a time duration equal to the time duration between the end of each pulse produced by the means for generating a driving pulse train and the time when the output of the associated integrator crosses zero;

(ii) a storage means for storing a control signal which indicates a direction of the torque of the torque command;

(iii) an armature winding having first and second ends;

(iv) first and second switching means each having three terminals and a controlling means with two inputs, the first input of the controlling means being coupled to an output of the means for producing pulses of a given width and a second input being coupled to an output of the storage means;

(v) the first terminal of the first switching means being coupled to a power supply potential, the second terminal of the first switching means being coupled to one end of the armature winding and the third terminal of the first switching means being coupled to ground potential through a sense resistor;

(vi) the first terminal of the second switching means being coupled to the power supply potential, the second terminal of second switching means being coupled to the other end of the armature winding and the third terminal of second switching means being coupled to ground through a sense resistor;

(vii) the controlling means of the first switching means causing the switching means to source current from the first terminal to the second terminal when the first input is low, and the second input is high, to sink current from the second terminal to the third terminal when the first input is low, and the second input is low, and to force the second terminal to a high impedance state when the first input is high; and (viii) the controlling means of the second switching means causing the second switching means to source current from the first terminal to the second terminal when the first input is low, and the second input is low, to sink current from the second terminal to the third terminal when the first input is low, and the second input is high, and to force the second terminal to a high impedance state when the first input is high.

12. A torque controller in accordance with claim 11 wherein:

the means for applying feedback included in the first and second means for activating is a differential amplifier with negative feedback with first and second input terminals respectively coupled to the third terminal of the first and second switching means with one of the input terminals being inverting and an output terminal producing the feedback applied to the associated summation means.

13. A torque controller in accordance with claim 5 wherein the first and second means for activating each further comprises:

(i) first and second switching means each having three terminals and a controlling means with two inputs, the first input of the first and second controlling means being coupled to the first and second outputs of the means for producing pulses of a given width and the second input of each controlling means being coupled to a positive reference potential;

(ii) the first terminal of the first switching means being coupled to a power supply potential, the second terminal of the first switching means being coupled to one end of the armature winding and the third terminal of the first switching means being coupled to ground potential through a sense resistor;

(iii) the first terminal of the second switching means being coupled to the power supply potential, the second terminal of second switching means being coupled to the other end of the armature winding and the third terminal of second switching means being coupled to ground through a sense resistor;

(iv) the controlling means of the first switching means causing the switching means to source current from the first terminal to the second terminal when the first input is high, and the second input is high, to sink current from the second terminal to the third terminal when the first input is low, and the second input is high, and to force the second terminal to a high impedance state when the second input is low; and (v) the controlling means of the second switching means causing the switching means to source current from the first terminal to the second terminal when the first input is high, and the second input is high, to sink current from the second terminal to the third terminal when the first input is low, and the second input is high, and to force the second terminal to a high impedance state when the second input is low.

14. A torque controller in accordance with claim 13 wherein:
the means for applying feedback included in the first and second means for activating is a differential amplifier with negative feedback with first and second input terminals respectively coupled to the third terminal of the first and second switching means with one of the input terminals being inverting and an output terminal producing the feedback applied to the associated summation means.

* * * * *